US007257570B2

(12) United States Patent
Riise et al.

(10) Patent No.: US 7,257,570 B2
(45) Date of Patent: Aug. 14, 2007

(54) GEOGRAPHICAL LOCATION EXTRACTION

(75) Inventors: Soren Riise, Ruislip (GB); Devesh Patel, Ruislip (GB); Eugene Heinz Stipp, London (GB)

(73) Assignee: Yahoo! Inc., Sunnyvale, CA (US)

( * ) Notice: Subject to any disclaimer, the term of this patent is extended or adjusted under 35 U.S.C. 154(b) by 427 days.

(21) Appl. No.: 10/745,093

(22) Filed: Dec. 22, 2003

(65) Prior Publication Data
US 2005/0108213 A1 May 19, 2005

(30) Foreign Application Priority Data
Nov. 13, 2003 (GB) ................................. 0326488.4
Nov. 13, 2003 (GB) ................................. 0326489.2

(51) Int. Cl.
G06F 7/00 (2006.01)
G06F 17/30 (2006.01)
(52) U.S. Cl. ........................................................ 707/3
(58) Field of Classification Search .................... 707/3, 707/100, 104.1; 701/200, 201
See application file for complete search history.

(56) References Cited

U.S. PATENT DOCUMENTS

| 6,377,961 B1 | 4/2002 | Ryu |
| 6,523,021 B1 | 2/2003 | Monberg et al. |
| 6,922,567 B1* | 7/2005 | Rydbeck .................. 455/456.3 |
| 2002/0087505 A1 | 7/2002 | Smith et al. |
| 2002/0138479 A1 | 9/2002 | Bates et al. |
| 2003/0061211 A1 | 3/2003 | Shultz |
| 2005/0048986 A1* | 3/2005 | Zhao et al. .............. 455/456.1 |
| 2005/0065916 A1* | 3/2005 | Ge et al. ........................ 707/3 |

FOREIGN PATENT DOCUMENTS

WO WO03/102738 12/2003

OTHER PUBLICATIONS

UK Patent Office, Combined Search and Examination Report. Aug. 22, 2005; 6 pp; correspoding GB App # GB0326488.4.

* cited by examiner

*Primary Examiner*—Sam Rimell
*Assistant Examiner*—Alicia Lewis
(74) *Attorney, Agent, or Firm*—Hancock Hughley LLP

(57) ABSTRACT

A geographical location extraction method and tool to infer a likely geographical location from one or more search terms entered as a query by a user on a search engine or the like.

15 Claims, 6 Drawing Sheets

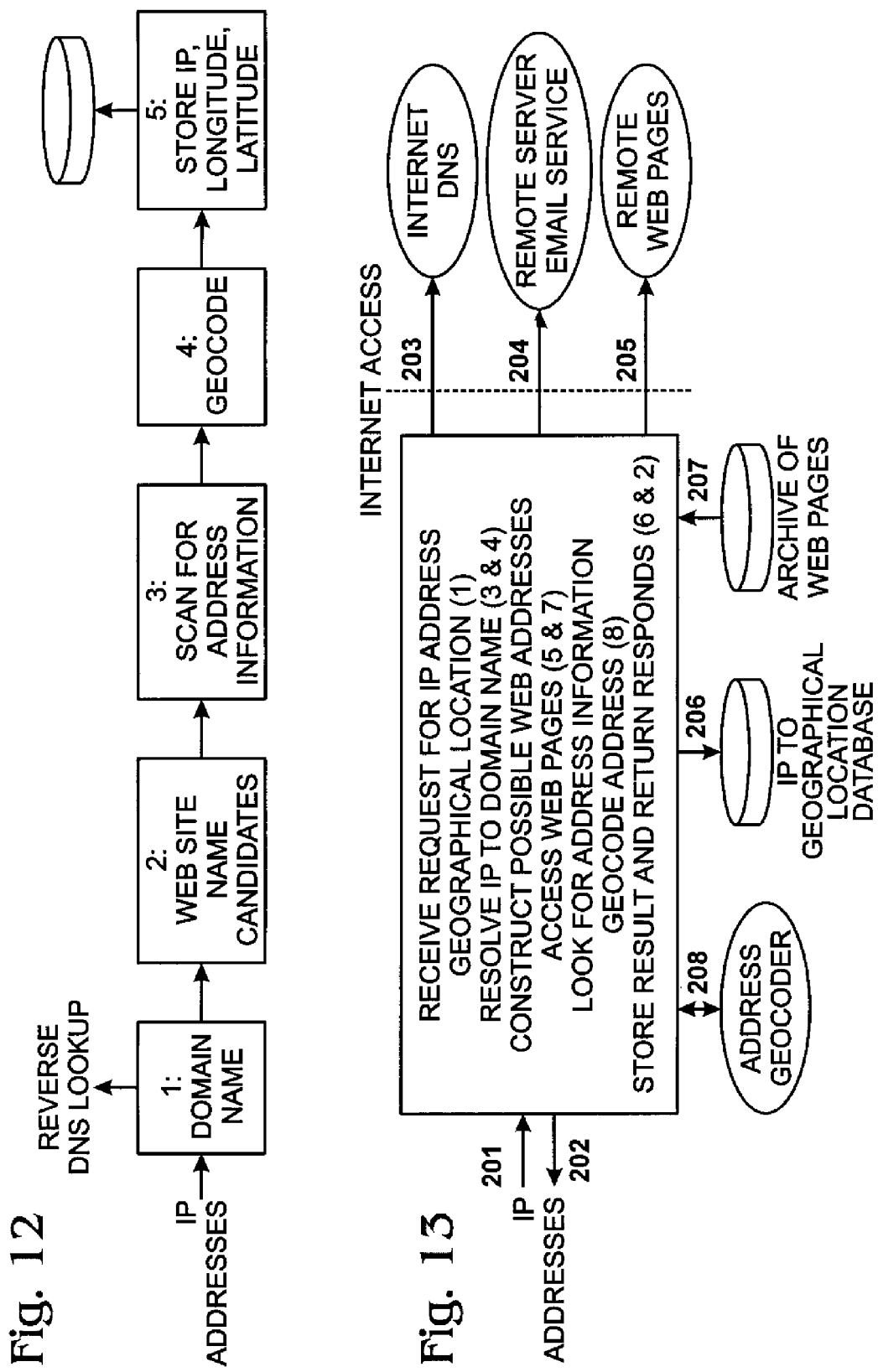

GEOGRAPHICAL LOCATION EXTRACTION

TECHNICAL FIELD

This invention relates to geographical location extraction and more particularly to methods of inferring a likely geographical location from one or more search terms entered as a query on a search engine or the like.

BACKGROUND

The geographic location of a user of a network and the network sites that a user may visit or reference have become increasingly important information for Internet Service Providers, Portals and Search Engines, particularly for Internet-based services where advertisers which to send content which is relevant, i.e. local to the user.

One attempt to deliver local-based content revolves around the mapping of a user's IP address to a geographic locality, this information being derived from the global distribution of International Phase addresses by the Internet Standards Governing Bodies (RIPE, ARIN, LAPNIC, APNIC) and the same for the processed for distribution by other commercial entities. Thus, even though a user is accessing a global Internet site, the IP address will signify to the site being visited the geographic location of the user to enable delivery of content local to the user. The geographical location information obtained from standards bodies and commercial vendors maps down to country level with reasonable confidence level, while location down to city level is available, but of variable quality and reliability.

Local content that might be delivered to a user of known location includes listing of services and/or product providers, information such as entertainment, local news, advertising, weather, traffic information and the like.

SUMMARY OF THE INVENTION

It is an object of the present invention to seek to overcome such difficulties and provide a mechanism for the context of location, thereby increasing relevance of a user query in delivering local content information to a user.

Accordingly, the present invention provides a geographical location extraction method to infer a likely geographical location from one or more search terms entered as a query by a user on a search engine or the like, the method comprising utilising one or more processes selected from the group consisting of: word analysis to determine which parts of a search query comprise location names and provide an indicator of the extent to which a given search term or part thereof should be treated as a geographical location; ranking geographical location names in accordance with the probability that the location names are likely to be searched; returning a list of probable locations in response to a search term comprising a non-geographical search term associated with a geographical location name; determining a geographical distance between a likely geographical location derived from the search term and a derived geographical location of a user; the user submitting criteria including a locality name, identifying from the criteria the locality name and returning, in dependence on the locality name, a probability that the locality name is associated with a geographical location; categorising search terms in a query into a local activity or a remote activity; analysing the order in which words appear in a search query string, in combination with a search in a locations database, to return a likelihood of a search term relating to a list of probable associated locations; and inferring a geographical location from a search query including a point of interest.

Preferably, the method comprises a combination of all the processes.

Conveniently, the step of word analysis to determine which parts of a search query comprise location names provides an indicator of the extent to which a given search term or part thereof should be treated as a geographical location by assigning a probability that a search term is a geographical location term and another probability that the search term is a non-geographical location term.

Advantageously, the method is further refined by calculating a probability split based on a word use frequency and the significance of the word as a geographical location name.

Preferably, ranking geographical location names in accordance with the probability that the location names are likely to be searched comprises ranking geographical location names by country-based statistics and town-based statistics to determine the search likelihood of geographical locations.

Conveniently, the probability of a location being the geographical location searched for is weighted by an event occurrence at the geographical location.

Advantageously, returning a list of probable locations in response to a search term comprising a non-geographical search term associated with a geographical location name comprises identifying a set of associated search words for a given geographical location name, there being an increased probability of the geographical location name being the term searched for if the non-geographical search term is in the set of associated search words for that geographical location name.

Preferably, the set of associated search words are identified by determining frequency of occurrence of search words in sources known to relate to a particular geographical location.

Conveniently, categorising search terms in a query into a local activity or a remote activity comprises rule-based processing or a look-up operation in a database of search terms and respective probabilities that the search term relates to a local activity ("near") or a remote activity ("far").

Advantageously, derived geographical information concerning the location of the user is used in combination with the "near" or "far" categorisation to determine whether a "near" or a "far" geographical location to the user location is sought by the search term.

Preferably, analysing the order in which words appear in a search query string comprises the further step of identifying the non-appearance of a word in the string and, in combination with a search in a locations database, returning a likelihood of a search term relating to a list of probable associated locations.

Conveniently, inferring a geographical location from a search query including points of interest comprises deriving the geographical location of the user and the points of interest, identifying the geographical distance from the user to the respective points of interest and inferring the geographical location to be the nearest point of interest to the user location.

Another aspect of the present invention provides a computer program comprising computer program code, or code adapted to perform all the steps of the preceding methods when said program is run on a computer.

Preferably, the computer program is embodied on a computer readable medium.

BRIEF DESCRIPTION OF THE DRAWINGS

In order that the present invention may be more readily understood embodiments thereof will now be described, by way of example, with reference to the accompanying drawings, in which:

FIG. 12 is a schematic block diagram of a method embodying the present invention; and FIG. 13 is a schematic block diagram of a system embodying the present invention.

DETAILED DESCRIPTION

Figure 1:
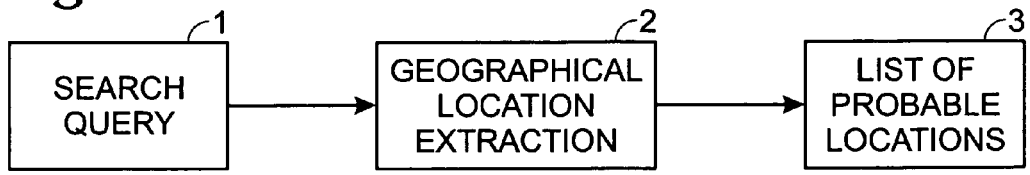
FIG. 1 is a schematic representation of a location extraction tool embodying the present invention.

Given a search query consisting of one or more words, there is a desire and need to extract a list of probable geographical locations from the given query. Locations in the list of search results being returned can be ranked based on their probability within the context of a given query. Referring to FIG. 1, a tool for carrying out a process for extracting geographical location from a search query 1 is illustrated in its broadest terms showing a geographic location extraction tool 2 responding to a search query 1, with a list of possible locations 3.

Figure 2A:
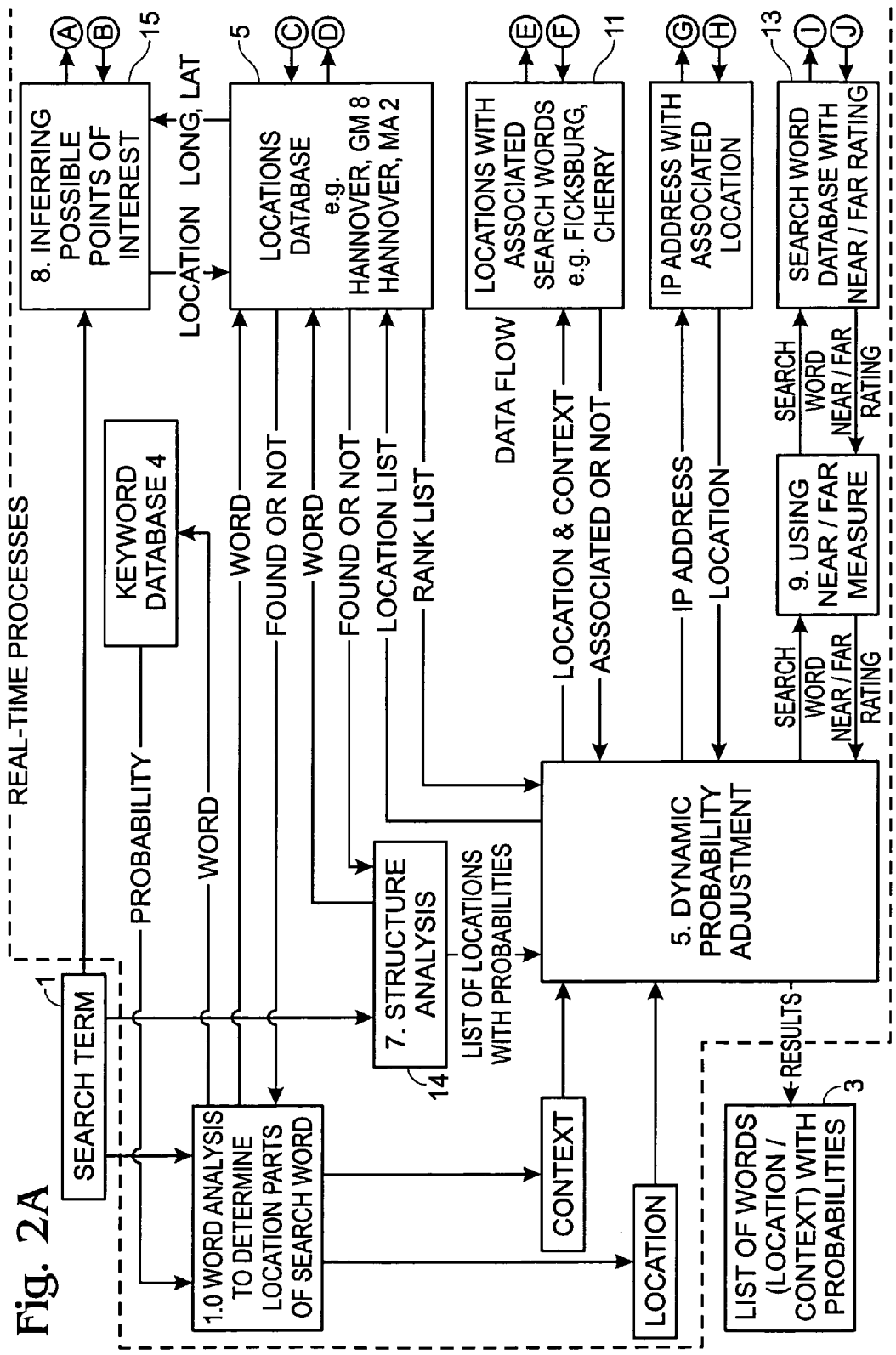
FIGS. 2A and 2B are schematic block diagrams of the processes embodying the present invention and represents a structural block diagram of a location extraction tool embodying the present invention.
Figure 2B:
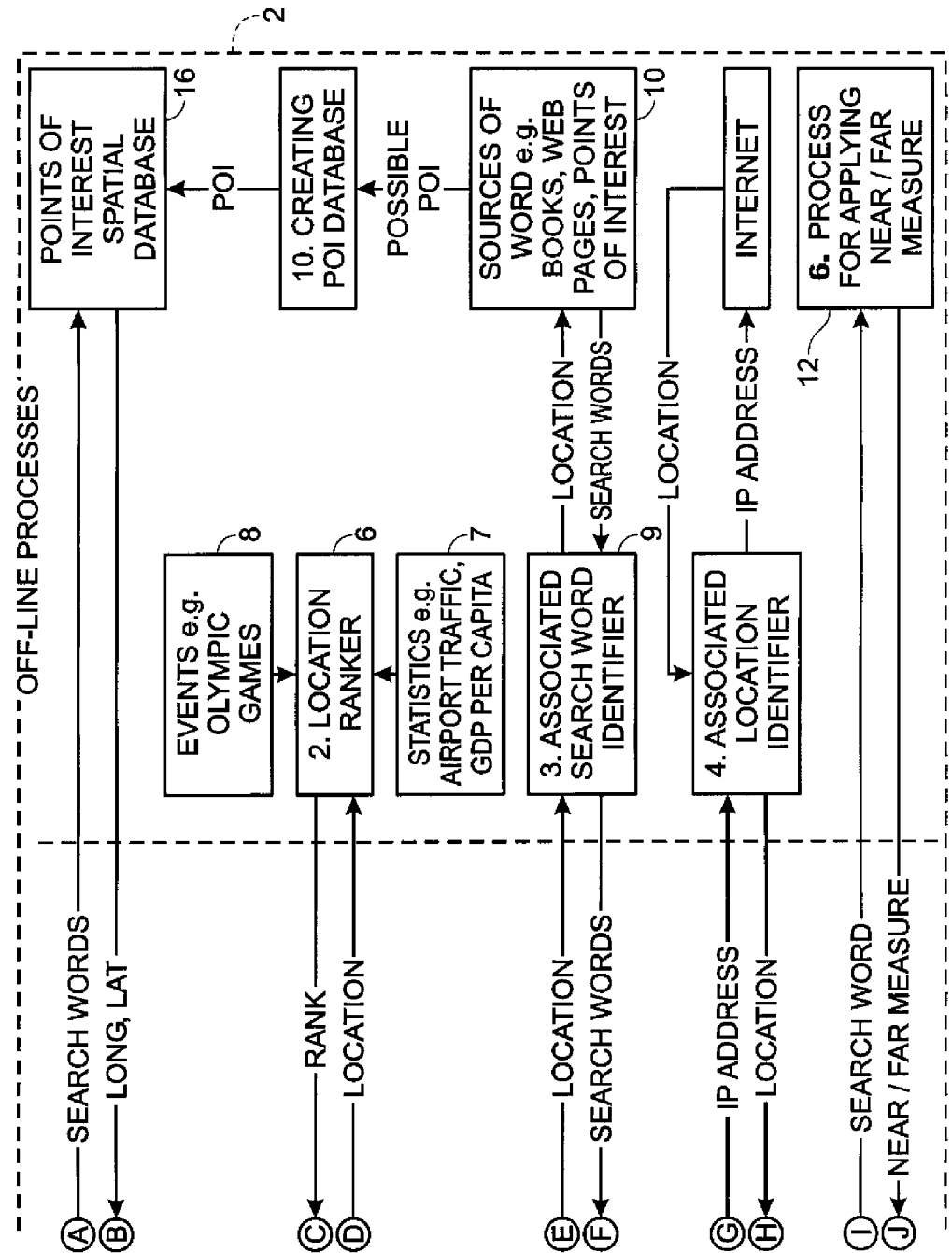

The geographic location extraction tool 2 is shown in more detail in FIGS. 2A-2B and can be seen to be made up of a number of sub-components which interact with one another ultimately to offer the best possible list of probable locations in response to a given search query. The sub-components are listed below and the interactions between the sub-components are labelled in FIGS. 2A-2B with the type of data flowing between the sub-components. The sub-component are identified in FIGS. 2A-2B as follows:

1. Word analysis to determine location parts of search words (real-time)
2. Location ranking (off-line)
3. Associated search word identifier (off-line)
4. Associated location to IP Address identifier (off-line)
5. Dynamic probability adjustment (real-time)
6. Creating a list of search-words with a near/far rating (off-line)
7. Doing a structure analysis on a query (real-time)
8. Inferring the location of points of interest (real-time)

This description is primarily concerned with the six components numbered 1, 2, 3, 6, 7, and 8. Components 4—associated location to IP Address identifier—(A method for determining accurate location for certain IP addresses) and 5—dynamic possibility adjustment—(Geo Probability) are described below after components 1,2,3,6,7 and 8.

The processes listed in the geographical location extraction tool shown in FIG. 2B as 9 (using near/far measure) and 10 (creating POI data base) are included for the purposes of clarity and completeness.

Figure 3:
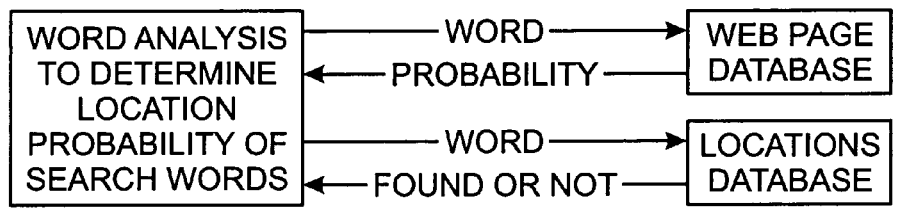
FIG. 3 is a schematic block diagram representing a process of word analysis embodying the present invention.

Referring to each of the sub-components of the geographical location extraction tool in turn:

1. Determining the Probability of a Search Word Being a Geographical Location:

This sub-component as shown in FIGS. 2A-2B and 3 takes a search word and returns a probability that it was meant as a geographical location.

First a keyword database 4 with word frequency is generated. This can be generated from sources by various methods such as analysing a large number of internet web pages or using other literature available to generate a statistical profile by counting the occurrence of each word and phrase. These will include words such as "flight", "restaurant", "police force", and "bay area".

Next, an existing geographical place names database 5 is intersected with the set of words found through frequency analysis.

Words which occur only in the keyword database 4 and not in the place name database 5, are assigned a probability of 1.0 for being non-geographical, and 0.0 for being geographical.

Words which occur only in the place name database 5 and not in the keyword database 4, are assigned a probability of 0.0 for being non-geographical, and 1.0 for being geographical.

For those words that occur in the intersection, a probability split is calculated based on the word use frequency, and the significance of the word as a place name. Thus given a particular search query, the probability that the query is referring to a location is determined by the maximum geographical-probability of each word and phrase in the query.

EXAMPLE 1

There might be no location called "computer" in the geographical location database 5. Hence the probability of "computer" being a location is zero.

EXAMPLE 2

There is a small town called "Hotel" in Croatia. Hence the search word "hotel" would be given a probability of 0.99 of being a pure keyword, and a probability of 0.01 of being the town Hotel in Croatia.

EXAMPLE 3

The keyword "rugby" has the same name as multiple geographical locations, Rugby in the UK (One in UK, one in Australia, two in South Africa and 12 in US). In such a case, the keyword "rugby" is ranked against geographical locations with the same name.

"Rugby" is also used in other contexts, such as a ball-game, which means that the word frequency in a standard body of text is going to be quite high.

Hence the keyword "rugby" could be given a probability of 0.6, and Rugby as a place name could be given a probability of 0.4.

This sub-component of the geographical location extraction tool is operable, therefore, to return probabilities and thereby provide an indicator of the extent to which a given search term should be treated as a location.

2. Pre-Query Location Ranking

Figure 4:
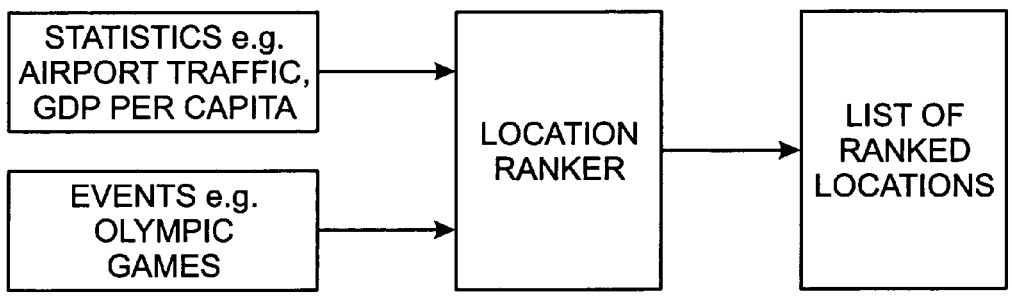
FIG. 4 is a schematic block diagram representing a process of location ranking embodying the present invention.

This sub-component 6 as shown in FIGS. 2A-2B and 4 uses country and location statistics such as airline traffic and GDP per capita to determine the search likelihood of geographical locations and to populate and update the locations database 5.

In the location ranker sub-component 6, firstly countries are ranked based on country-based statistics such as those given below and held in a statistics database 7, together with an importance rating for every statistic. The table below shows an example importance distribution of country based statistics. Other statistics can, of course, also be used and the below list is not exhaustive. Less statistics than those given below may be used.

| Statistic | Importance |
| --- | --- |
| Population | 0.1 |
| GDP per capita | 0.2 |
| No telephone lines | 0.05 |
| No installed PCs | 0.05 |
| No mobile phones | 0.05 |
| No Internet users | 0.3 |
| No credit/debit cards | 0.3 |

Secondly, locations (i.e. towns or other regions) are ranked against each other by using the rank of their associated country and other town-based statistics such as the ones given in the table below and which are also held in the statistics database 7.

| Statistic | Importance |
| --- | --- |
| Population | 0.2 |
| Geometric size | 0.05 |
| Airport traffic | 0.2 |
| Commercial ranking | 0.05 |
| No of IP ranges | 0.3 |
| Country popularity | 0.2 |

The popularity of a location might increase because of some event such as the Olympic Games. Hence, major event occurrence is taken into account when the ranking is calculated and can be a factor in weighing the importance of a statistic or as a statistic in its own right. Such event information 8 is preferably fed as a separate input to the location ranker sub-component 6.

EXAMPLE 4

Hannover in Germany will obtain a higher ranking than Hannover in Maryland, because there are more people and more internet users in Hannover Germany.

EXAMPLE 5

San Antonio in Venezuela is the second largest San Antonio in the world. However, San Antonio in Ibiza is more popular, because it is a favorite holiday destination. This can be seen by looking at the airport traffic information.

The location ranker sub-component is thus used to build up the locations database 5 and to rank entries in the locations database by the probability that that entry is the entry being searched.

3. Associated Search Word Identifier

Figure 5:
FIG. 5 is a schematic block diagram representing an associated search word process embodying the present invention.

This sub-component, the associated search-word identifier 9 as shown in FIGS. 2A-2B and 5, finds associated search words for a given location name.

For every location in a large global database, a search-word list is generated as follows. A large list of sources 10 (books, webpages, documents, articles, etc.) can be associated with a geographical location. One method of association would be to geocode the contact details on webpages, that is to derive latitude and longitude information from address information or the like given on a web page.

For every word in a source 10 the following are defined:
Local frequency=frequency of a word within all sources of text associated with a given location;
Global frequency=frequency of a word over all available sources of text; and
Relative frequency=local frequency/global frequency The top 10 or 20 search words (with highest relative frequency) are stored in an associated search word database 11 in conjunction with their associated geographical location.

EXAMPLE 6

For example, there might be two towns called Ficksburg, one in South Africa and one in Australia. Hence a list of webpages is divided up into those relating to Ficksburg South Africa and those relating to Ficksburg Australia. Webpages that contain the words South Africa several times or that contain address information relating to Ficksburg in SA would be associated with Ficksburg in SA. Ficksburg, S.A. hosts an annual cherry festival and hence "Ficksburg" is closely associated with the word "cherry".

A webpage with a postcode that geocodes to a point close to the centroid (or borders) of Ficksburg in Australia would be associated with Ficksburg in Australia. The table below gives and example of words found in webpages associated with the town of Ficksburg in South Africa. The keyword "cherry" would probably make it into the top 10 list for Ficksburg SA, whereas "because" or "apple" would probably not make it.

| Keyword | Local Frequency | Global frequency (in million) | Relative frequency |
| --- | --- | --- | --- |
| cherry | 1200 | 4 | 300 |
| because | 2000 | 100 | 20 |
| Apple | 400 | 25 | 16 |

When searching for "cherry Ficksburg", an application, tool, or logical unit that incorporates this sub-component is able to give a higher probability to the Ficksburg in South Africa than the one in Australia despite the fact that the one in Australia might, for example, have a larger population.

6. Creating a List of Search-Words with a Near/Far Rating

Figure 6:
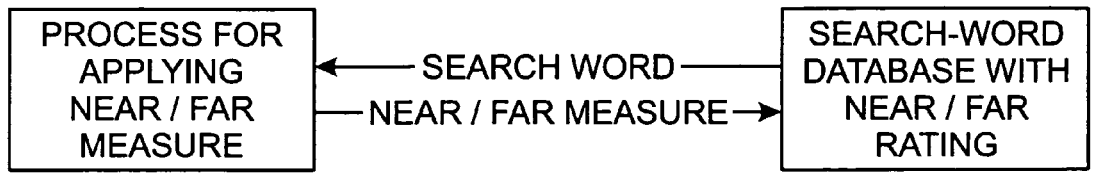
FIG. 6 is a schematic block diagram representing a near/far rating process embodying the present invention.

This sub-component 12 uses a near/far database 13 as shown in FIGS. 2A and 6 of typical search words together with an indication of whether a search word means "near" or "far" from the location of user. For example, "plumber" relates to a local or "near" activity, whereas "flight" is more likely to relate to a remote or "far" activity. This database 13 can then be used to calculate the probability that a particular location is the one that a user is searching for.

The search-words can either be organised into categories for rule-based processing or into probability lists for determining near/far relationships.

EXAMPLE 7

A person that is in Baltimore Md. location (known or assumed from the user's IP Address) searching for "plumber Hannover" is probably searching for a plumber in Hannover Md., rather than for a plumber in Hannover Germany.

EXAMPLE 8

However, that same user in Baltimore searching for "flight Hannover" or "holiday Hannover" is more probably searching for a flight to Hannover Germany than Hannover Md.

This sub-component 12 can therefore return a probability or search-likelihood of two locations with the same name based on the "near/far" context provided by a search word.

7. Structure Analysis on a Query

Figure 7:
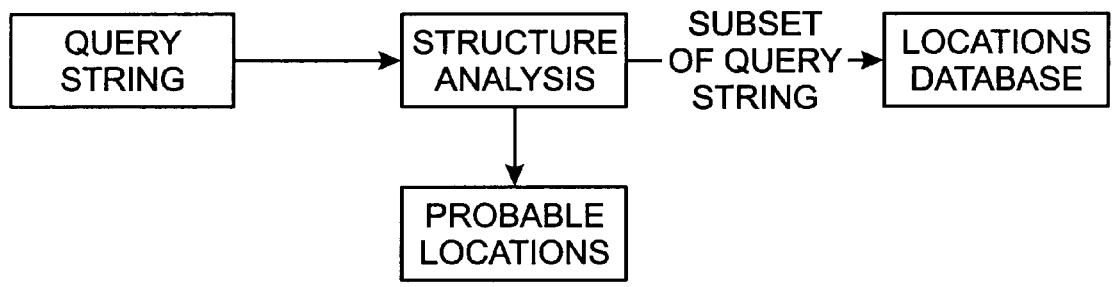
FIG. 7 is a schematic block diagram representing a structural analysis process embodying the present invention.

This sub-component comprises a structure analysis process 14 as shown in FIGS. 2A and 7 to analyse the order in which words appear (or do not appear) in a query string, in combination with a search in the locations database 5, and adjusts the likelihood of a search term relating to a list of probable associated locations.

EXAMPLE 9

Consider the two queries "cinema leicester square" and "square dancing leicester". In the first query the user is probably searching for the location "Leicester Square" in London whereas in the second query the user is probably looking for the town of "Leicester".

By purely analysing all combinations of words both "Leicester" and "Leicester Square" would be returned as probable locations (assuming that both Leicester and Leicester Square are actual place names) and weighted on their rank (based on various statistics). However, by the structural analysis component identifying that "Leicester" is followed by "square" in the first example, the probability of "Leicester Square" compared to "Leicester" is increased. Thus, "Leicester Square" in the first example will be weighted higher than "Leicester" in the list of locations with probabilities output by this sub-component 14.

This sub-component distinguishes (by probability weighting) between double, triple, or quadruple-barrel location names that might contain location names as a subset. The combination of the structure analysis component 14 and the search in the locations database 5 makes the distinction possible.

8. Inferring the location of points of interest

Figure 8:
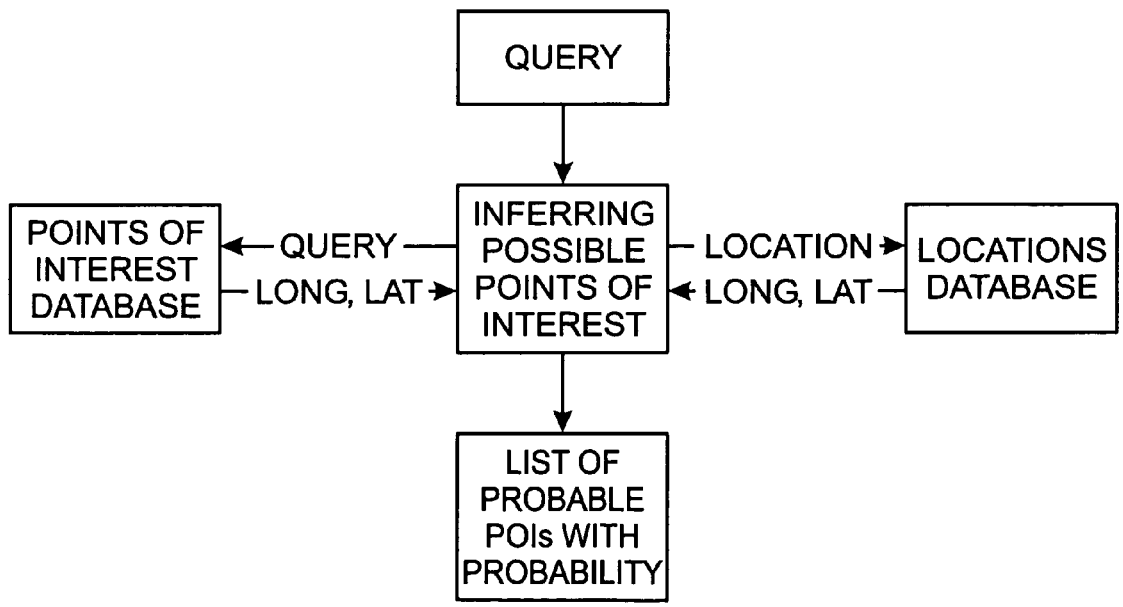
FIG. 8 is a schematic block diagram representing a process for determining probable points of interest embodying the present invention.

The inferring possible points of interest sub-component 15 as shown in FIGS. 2A and 8 outputs a list of probable points of interest and an associated probability so as to update the locations database 5.

It is possible to assign probabilities to two points of interest with the same name in a search query by doing a spatial lookup and comparing the distances to a known location (such as the IP Address of the user or other information such as determined by other real-time processes such as the aforementioned structure analysis sub-component 14).

EXAMPLE 10

The search query is "Guggenheim Museum" but there are Guggenheim museums in New York, Bilbao, Venice, Berlin, and Las Vegas. By looking up the longitude and latitude for each of these in a spatial database 16 and measuring the distance to a known location (such as the IP Address of the user) it can be decided which Guggenheim museum the user has in mind, i.e. the geographically nearest Guggenheim Museum to the user's location.

Even without the known location of the user, the search query "Guggenheim Museum" will have inferred the five possible locations listed above by using the geographical location of the Guggenheim museums by doing a spatial lookup in the location database.

This sub-component is useful to search for Points of Interest with the same name that might occur in more than one geographical location.

5. Dynamic Probability Adjustment

The following description of sub-component 5—dynamic possibility adjustment —is in terms of and in relation to an Internet-based search engine interrogated by an Internet-based user from a computer such as a desktop PC but it should be appreciated that the process is equally applicable to non-Internet-based search engines and computers operating in other network environments such as cellular and mobile communication networks. The process is also readily applicable to implementation on various forms of computer such as: desktop PC, portable PC, Personal Digital Assistant (PDA), mobile telephone or other mobile communication device.

Figure 9:
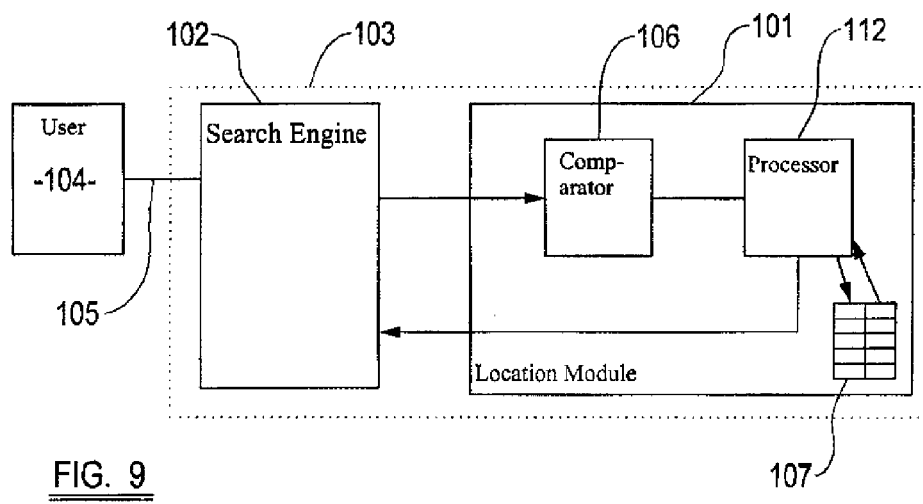
FIG. 9 is a schematic block diagram of a system incorporating a location module embodying the present invention.

Referring to FIG. 9, the invention is, in this example, configured as a location module 101 shown as being distinct from a search engine 102. However, the location module can also be incorporated in the search engine as shown by phantom line 103. In one example of the present invention utilising a conventional Internet-based search engine, a user of a computer 104 linked over a network 105, preferably the Internet, enters a search term or search criteria as text in a search field including one or names of localities for which the user is searching for further information. In this example, the user enters "Hotels Paris" as the user is trying to identify Internet sites providing information about hotels in the geographical location of the city of Paris, France.

Once the search criteria incorporating at least one locality name (in this case "Paris") has been submitted to the search engine 102, the location module 101 reviews and parses the search criteria and divides the submitted text into text which is or might be locality names and text which is not a locality name. A comparator 106 tests the text which is or might be locality names against a table (described below) of known locality names to verify whether the submitted criteria includes locality names. Thus, the locality names are identified from the search criteria by the location module.

There is a link between the identified locality name and one or more geographical locations. In a preferred example, the link is embodied as a probability vector in a lookup table 107 (see FIG. 10) between an identified locality name 8 and one or more geographical locations 109. The specific probabilities can be established heuristically but, in any event, represent the likelihood of the searched for locality name being at a particular one of the geographical locations. Referring to FIG. 102, the locality name 108 is "Paris" on one side of the table 107 and is linked to the two possible geographical locations 109a, 109b of "Paris, France" and "Paris, Tex., USA" by respective probability vectors 110, 111.

The vector probabilities 110,111 linking between the locality name and the geographical location are returned to the search engine by a processor 112 of the location module, in dependence on the locality name, as the respective probabilities that that specific locality name 101 is associated with those two geographical locations 102. The processor may include the table 107 or have access thereto as shown in FIG. 113.

A determination is made by the location module or the search engine as to which of the geographical locations 109a, 109b was intended by the user based on the probability results: preferably by electing the higher of the two probabilities 110,111.

The search engine 102 can then provide search results limited to or refined by the geographical location determined by the location module 101 as well as providing to the user 104 news, advertising content or the like local to the geographical location determined by the location module.

Figure 11:
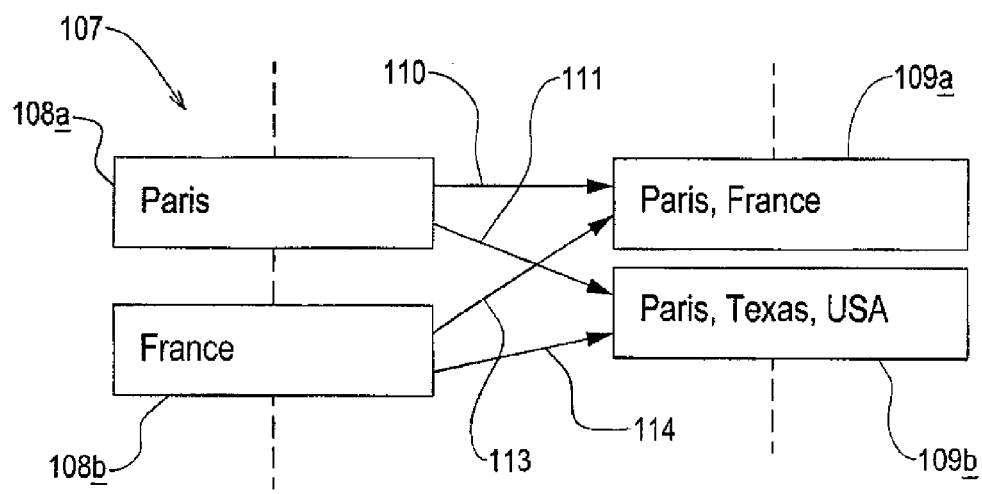

If the search criteria includes more than one locality name, for example "Hotels Paris France" as in FIG. 11, then the location module 101, identifies each of the locality names "Paris" 108a and "France" 108b and provides, in dependence on each locality name 108a,108b, a vector probability 110,111,113,114 that each of the locality names is associated with a geographical location but importantly then also combines the returned probabilities to return a probability that the plurality of location names is associated with a geographical location. The extraction of the location-based words is done using a grill-based algorithm using a global hierarchical data set for town, provinces and countries which will allow the parser to understand the relationship between each word when combining multiple vectors to derive likelihood of user interests in either Paris, France, of Paris, Tex. Preferably, the step of combining selected ones of multiple probability vectors 110,111,113,114 is by way of a dot product (although the combination step is not limited to this function). The combined probability, in this case of vector probabilities 110 and 113 being the two highest probabilities returns a very high probability in this example that the geographic location is Paris, France. The composite probability is then returned by the location module 101 to the search engine 102 to provide search results limited to or refined by the geographical location determined by the location module as well as providing news, advertising content or the like local to the geographical location determined by the location module.

Rather than making a determination, the location module can return the probabilities to the user as a list of possible geographic locations from which the user can manually select or confirm a geographic location.

Figure 10:
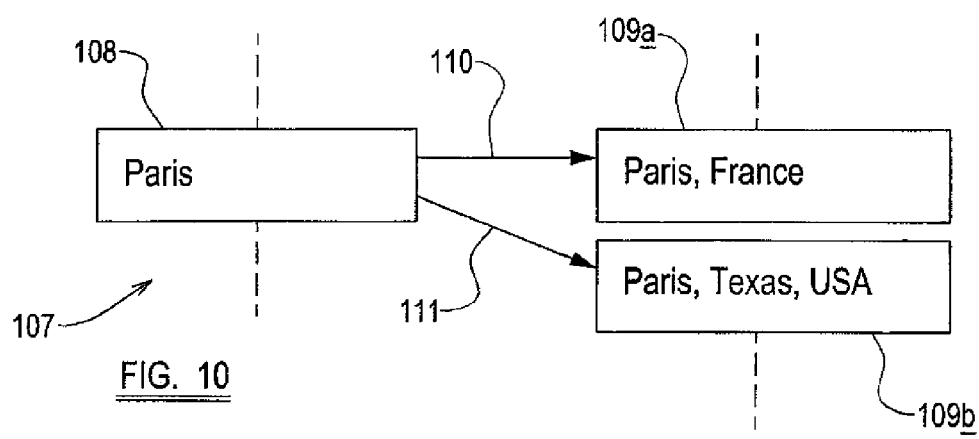
FIGS. 10 and 11 are examples of look-up tables for use with embodiments of the present invention.

In the case of the Internet, the computer of the user will have an IP address (it should be appreciated that when a computer is part of a network, not necessarily the Internet, the computer will have a network address). The IP address is mapped to a geographical location. The vector probabilities 110,111 can be weighted by the geographical location mapped from the user's IP address. Thus, if a user's IP address indicates that the user is located in Northern Tex., then the likelihood is that that user is probably looking for hotels in Paris, Tex. as opposed to Paris, France. Accordingly, the location module manipulates the vector probabilities in the look-up table in dependence on the mapped geographical location indicated by the network address. This weighting of the vector probabilities can affect the outcome of any determination by the search engine or location module—i.e. when unweighted, the probability vectors clearly favour Paris, France as the more probable searched for geographic location of the two possibilities in FIG. 9 but, as shown in FIG. 10, factoring in the weighting in dependence on the user's IP address mapped location, in Northern Texas, shifts the probability vectors such that Paris, Tex. is the more likely searched for geographic location.

It is possible to implement the same system for searches initiated in mobile cellphone network environments, but rather than using IP addresses for identification of the user location, the user location is determined by existing network infrastructure such as GNLC or GBS units as supported by the particular network.

The above description relates to the returning of a probability or determination based upon vector probabilities. Other means for returning a probability or determination that a searched for locality name relates to one or more specific geographic locations are possible and include: linking a locality name to one or more of the geographic locations, the locality names and the geographic locations being configured in a decision graph; linking a locality name to one or more of the geographic locations, the locality names and the geographic locations being configured in a neural network having an output layer comprising the or each returned probability; an genetic programming and algorithm, where a population of slightly different versions of the location module 101 are running in parallel. The end application (i.e. search engine 102) will report successful behaviour in terms of user clicks, which then in turn can be used to drive the selection criteria for the genetic algorithm when dynamically creating the next generation of location modules.

The invention also allows the geographic location information mapped from a user's IP address to be refined. In this regard, the location module already holds or can request a likely geographical location of a network user based on geographic location information mapped from a user's computer IP address in the case of the network being the Internet. The location module continually monitors or samples search criteria submitted by a user, including any locality names in the search criteria. If the user's IP address is mapped to London, for example, and the user enters a search criterion comprising "Islington restaurants", then there is a high probability that the London user is at the geographical location of Islington within London, Islington being a sub-location of the geographic location of London. Thus, the location module determines if the locality name "Islington" is a sub-location within the geographic location "London" indicated by the geographic location information mapped from a user's IP address, preferably by way of a look-up table similar to that described above. After a statistically significant number of samples of search criteria have been monitored by the location module for locality names which are a sub-location of the geographic location information mapped from a user's IP address, a probability can be returned that the user is located in one or more of the identified sub-locations. The geographic location information mapped from the user's IP address can then be refined if the probability is above a given threshold to indicate that the user is located in one of the sub-locations. That information can then be held by the location module for subsequent use in directing content local to the identified sub-location to the user.

4. Associated Location to IP Address Identifier

The sub-component 4—associated location to IP address identifier—provides a method which allows the refinement of the geographical location for certain IP addresses down to the resolution of a postal address level.

The method exploits the features of the pervading IT infrastructure where internet access is via a few IP addresses registered to a proxy server or router/firewall. The typical IT infrastructure of many local offices, such as business and universities, across the world usually involves a single geographical location with internet access from a few IP addresses registered for their use.

There are a number of commercially available applications for IP address location mapping which allow the majority of IP address to be located to the resolution of a city or a country level. However, it would be beneficial to many internet applications to have better resolution, if only for some IP address, as not all IP addresses are equally important. It should be noted that a significant amount of web browsing is done from the work place from where it is possible to map a user's location down to the actual postal address of the company work place.

The present invention exploits some of the following features, namely that:
1) IP addresses are not all equally "important". Most office IT infrastructures use a shared gateway to the internet (whether a proxy server or a router) which hides the true internal IP address of the client, only exposing one (or at least very few) IP addresses assigned to the company. The IP address of the internet gateway for such an infrastructure is more important than any other IP address assigned to the company. The search space of IP addresses in, for example IPv4 can be dramatically reduced from the approximately 4 billion (2 to the power of 32) possible IP addresses in the IPv4 to a fraction less than a million by gathering statistics on which IP addresses are actually used for web access.
2) it is noted that most businesses have a web page that contains contact information and driving instructions; and
3) it is further noted that most businesses with a high level of computer users operate their own mail server, or other service that requires in-bound connectivity, and hence are likely to have their respective domain name associated with at least some of the IP addresses.

In the following example of a system (FIG. 13) and method (FIG. 12) embodying the present invention, source information comprises an IP address and the method operates upon the source information to provide an accurate geographical location down to street level address resolution of the equipment associated with the given IP address.

The construction of the system involves a computer system as shown in FIG. 13 with a connection to the Internet or other network. The computer has disk storage for the accumulation of data, and an interface 201 for requesting analysis of a given IP address. The interface is either provided as an interface over the internet, a local screen, or similar data entry form. The computer system has access to DNS services 203 across the internet, and is able to access web pages using the HTTP protocol 205, likewise across the internet. In an alternative implementation, the Web pages may be accessible from internal storage 207 where the pages have been retrieved at an earlier stage.

An IP address requested for analysis is received over the interface 201 as described above. The system starts by accessing the DNS service 203 to perform a Reverse DNS lookup. The Reverse DNS lookup will either provide an Domain Name, or an error indicating no domain name is associated with the IP address.

If an error is received, alternative means such as trying to contact the IP address using the SMTP (email) port 204, which, if configured, typically includes the domain name of the server in the first responds line.

Once the domain name have been provided it will be broken up and reformatted into possible web page addresses. Each of these addresses are then attempted accesses 205 to check if they contain web pages containing a contact address. The contact address is then collected and by using standard geocoding software 208 translated to a precise longitude/latitude.

The geographical address and IP address is then stored 206 for future reference (cache or other usage), and a response is returned to the original requester 202.

Thus, referring to FIG. 12 and starting with the source information of an IP address such as 123.213.132.123, the method firstly involves an interrogation of the Directory Name Service or an equivalent database containing mapped IP address and corresponding Domain Name/symbolic name information, this step can be referred to as a reverse DNS look-up. The interrogation of the DNS service returns a domain name in response to the given IP address.

Having retrieved the domain name (e.g. mypc.myoffice.example.com), the web site address is derived therefrom by stripping and replacing the front part of the domain name with a commonly used name for web sites (e.g. www). In the present example where the domain name has a number of components, multiple attempts at deriving the web site address are made so the following would be identified as likely web site addresses associated with the given IP address:
www.mypc.myoffice.example.com;
www.myoffice.example.com; and
www.example.com.

The site of each of the derived web site addresses is then scanned for address information, driving directions and the like so as to determine geographical address information including a street level address for the given IP address.

Any address information derived from the one or more web sites is geocoded to provide an accurate longitude and latitude for that location.

The longitude and latitude information is then paired with the given IP address and stored for internet application use in a database maintained for that purpose.

The process is used repetitively to build a database of the most important IP addresses and their corresponding longitude and latitude information. The database can also hold the information gathered at intermediate stages in the process outlined above so that for any IP address which is subjected to the process, there will be a record of the corresponding Domain Name, likely web site addresses, geographical address information derived from the web site(s) and the longitude and latitude information geocoded from the geographical address information.

The invention can be configured as a computer program comprising computer program code means adapted to perform the relevant steps when said program is run on a computer. Further, said computer program can be embodied on a computer readable medium.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A geographical location extraction method to infer a likely geographical location from one or more search terms entered as a query by a user on a search engine or the like, the method comprising utilising a combination of all of the processes of:
   word analysis to determine which parts of a search query comprise location names and provide an indicator of the extent to which a given search term or part thereof should be treated as a geographical location;
   ranking geographical location names in accordance with the probability that the location names are likely to be searched;
   returning a list of probable locations in response to a search term comprising a non-geographical search term associated with a geographical location name;
   the user submitting criteria including a locality name, identifying from the criteria the locality name and returning, in dependence on the locality name, a probability that the locality name is associated with a geographical location; and
   analysing the order in which words appear in a search query string, in combination with a search in a locations database, to return a likelihood of a search term relating to a list of probable associated locations.

2. The method according to claim 1, wherein the step of word analysis to determine which parts of a search query comprise location names provides an indicator of the extent to which a given search term or part thereof should be treated as a geographical location by assigning a probability that a search term is a geographical location term and another probability that the search term is a non-geographical location term.

3. The method according to claim 2 wherein the method is further refined by calculating a probability split based on a word use frequency and the significance of the word as a geographical location name.

4. The method according to claim 1, wherein ranking geographical location names in accordance with the probability that the location names are likely to be searched comprises ranking geographical location names by country-based statistics and town-based statistics to determine the search likelihood of geographical locations.

5. The method according to claim 4, wherein the probability of a location being the geographical location searched for is weighted by an event occurrence at the geographical location.

6. The method according to claim 1, wherein returning a list of probable locations in response to a search term comprising a non-geographical search term associated with a geographical location name comprises identifying a set of associated search words for a given geographical location name, there being an increased probability of the geographical location name being the term searched for if the non-geographical search term is in the set of associated search words for that geographical location name.

7. The method according to claim 6, wherein the set of associated search words are identified by determining frequency of occurrence of search words in sources known to relate to a particular geographical location.

8. The method according to claim 1 further comprising one or more of the processes of:
   categorising search terms in a query into a local activity or a remote activity;
   inferring a geographical location from a search query including a point of interest; and
   determining a geographical distance between a likely geographical location derived from the search term and a derived geographical location of a user.

9. The method according to claim 8, wherein categorising search terms in a query into a local activity or a remote activity comprises rule-based processing or a look-up operation in a database of search terms and respective probabilities that the search term relates to a local activity ("near") or a remote activity ("far").

10. The method according to claim 8, wherein derived geographical information concerning the location of the user is used in combination with a local activity ("near") or a remote activity ("far") categorisation to determine whether a "near" or a "far" geographical location to the user location is sought by the search term.

11. The method according to claim 8, wherein inferring a geographical location from a search query including points of interest comprises deriving the geographical location of the user and the points of interest, identifying the geographical distance from the user to the respective points of interest and inferring the geographical location to be the nearest point of interest to the user location.

12. The method of claim 8 comprising a combination of all the processes of claim 8.

13. The method according to claim 1, wherein analysing the order in which words appear in a search query string comprises the further step of identifying the non-appearance of a word in the string and, in combination with a search in a locations database, returning a likelihood of a search term relating to a list of probable associated locations.

14. A computer-readable medium containing a set of instructions for a general purpose computer and adapted to infer a likely geographical location from one or more search terms entered as a query by a user on a search engine or the like, utilising—a combination of all processes of:
   word analysis to determine which parts of a search query comprise location names and provide an indicator of the extent to which a given search term or part thereof should be treated as a geographical location;
   ranking geographical location names in accordance with the probability that the location names are likely to be searched;
   returning a list of probable locations in response to a search term comprising a non-geographical search term associated with a geographical location name;
   the user submitting criteria including a locality name, identifying from the criteria the locality name and returning, in dependence on the locality name, a probability that the locality name is associated with a geographical location; and
   analysing the order in which words appear in a search query string, in combination with a search in a locations database, to return a likelihood of a search term relating to a list of probable associated locations.

15. The computer readable medium according to claim 14 further adapted to infer a likely geographical location by using one or more of the processes of inferring a geographical location from a search query including a point of interest; categorising search terms in a query into a local activity or a remote activity and determining a geographical distance between a likely geographical location derived from the search term and a derived geographical location of a user.

* * * * *